(12) United States Patent
Hagiopol et al.

(10) Patent No.: US 7,589,153 B2
(45) Date of Patent: Sep. 15, 2009

(54) GLYOXALATED INTER-COPOLYMERS WITH HIGH AND ADJUSTABLE CHARGE DENSITY

(75) Inventors: Cornel Hagiopol, Lilburn, GA (US); Yuping Luo, Duluth, GA (US); David F. Townsend, Grayson, GA (US); Clay E. Ringold, Decatur, GA (US); Karla D. Favors, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 464 days.

(21) Appl. No.: 11/136,730

(22) Filed: May 25, 2005

(65) Prior Publication Data

US 2006/0270801 A1  Nov. 30, 2006

(51) Int. Cl.
*C08F 8/00* (2006.01)
(52) U.S. Cl. .................. 525/194; 525/191; 525/192; 525/218; 162/166; 162/168.3; 162/164.6
(58) Field of Classification Search ............. 525/191, 525/192, 194, 218; 162/164.6, 166, 168.3
See application file for complete search history.

(56) References Cited

U.S. PATENT DOCUMENTS

| | | | |
|---|---|---|---|
| 2,926,116 A | 2/1960 | Keim | |
| 2,926,154 A | 2/1960 | Keim | |
| 3,556,932 A | 1/1971 | Coscia et al. | |
| 3,556,933 A | 1/1971 | Williams | |
| 3,607,622 A | 9/1971 | Espy | |
| 3,740,391 A * | 6/1973 | Williams et al. | 536/45 |
| 3,773,612 A | 11/1973 | Avis | |
| 4,060,507 A | 11/1977 | Floyd et al. | |
| 4,122,071 A * | 10/1978 | Moriya et al. | 525/328.4 |
| 4,217,425 A | 8/1980 | Ballweber et al. | |
| 4,233,411 A * | 11/1980 | Ballweber et al. | 525/155 |
| 4,501,640 A | 2/1985 | Soerens | |
| 4,508,594 A | 4/1985 | Jansma et al. | |
| 4,528,316 A | 7/1985 | Sorens | |
| 4,603,176 A | 7/1986 | Bjorkquist et al. | |
| 4,605,702 A | 8/1986 | Guerro et al. | |
| 4,605,718 A | 8/1986 | Jansma et al. | |
| 4,785,055 A | 11/1988 | Dexter et al. | |
| 4,853,431 A | 8/1989 | Miller | |
| 4,954,538 A | 9/1990 | Dauplaise et al. | |
| 4,966,652 A | 10/1990 | Wasser | |
| 5,019,606 A * | 5/1991 | Marten et al. | 523/414 |
| 5,147,908 A | 9/1992 | Floyd et al. | |
| 5,179,150 A | 1/1993 | Furman | |
| 5,187,219 A | 2/1993 | Furman | |
| 5,401,810 A | 3/1995 | Jansma et al. | |
| 5,427,652 A | 6/1995 | Darlington et al. | |
| 5,466,337 A | 11/1995 | Darlington et al. | |
| 5,567,798 A | 10/1996 | Dulany et al. | |
| 5,585,456 A | 12/1996 | Dulany et al. | |
| 5,674,362 A | 10/1997 | Underwood et al. | |
| 5,763,523 A | 6/1998 | Chen et al. | |
| 5,763,530 A | 6/1998 | Chen et al. | |
| 5,783,041 A | 7/1998 | Underwood et al. | |
| 5,869,589 A | 2/1999 | Raynolds et al. | |
| 5,883,181 A | 3/1999 | Cicchiello et al. | |
| 5,914,366 A | 6/1999 | Cicchiello et al. | |
| 5,951,719 A | 9/1999 | Cooper et al. | |
| 6,077,394 A | 6/2000 | Spence et al. | |
| 6,080,804 A | 6/2000 | Davies et al. | |
| 6,103,064 A * | 8/2000 | Asplund et al. | 162/168.3 |
| 6,103,861 A | 8/2000 | Staib | |
| 6,165,259 A * | 12/2000 | Hallstrom et al. | 106/243 |
| 6,197,919 B1 * | 3/2001 | Crisp et al. | 528/230 |
| 6,214,932 B1 | 4/2001 | Maslanka | |
| 6,245,253 B1 | 6/2001 | Grasshoff et al. | |
| 6,429,253 B1 | 8/2002 | Guerro et al. | |
| 6,429,267 B1 * | 8/2002 | Riehle | 525/430 |
| 6,491,790 B1 | 12/2002 | Proverb et al. | |
| 2001/0042606 A1 * | 11/2001 | Harper et al. | 162/111 |
| 2004/0118541 A1 | 6/2004 | Shannon | |
| 2006/0162886 A1 * | 7/2006 | Smith et al. | 162/166 |

OTHER PUBLICATIONS

U.S. Appl. No. 10/785,403, filed Feb. 25, 2004, Hagiopol et al.
U.S. Appl. No. 10/919,487, filed Aug. 17, 2004, Hagiopol et al.
U.S. Appl. No. 10/919,488, filed Aug. 17, 2004, Hagiopol et al.

* cited by examiner

*Primary Examiner*—Eric Hug
*Assistant Examiner*—Dennis Cordray
(74) *Attorney, Agent, or Firm*—Michael S. Kerns

(57) ABSTRACT

A method for making storage-stable glyoxalated inter-copolymers with higher and adjustable charge density suitable for use as a strengthening agent for paper. The glyoxalated inter-copolymers can be used to enhance the strength of paper, particularly recycled paper and mechanical printing paper.

36 Claims, No Drawings

GLYOXALATED INTER-COPOLYMERS WITH HIGH AND ADJUSTABLE CHARGE DENSITY

FIELD OF THE INVENTION

The present invention relates to methods for preparing paper strengthening agents with high and adjustable charge density.

BACKGROUND OF THE INVENTION

Acrylamide co-polymers are widely used in the manufacture of 100% recycled fiber paper and to re-build strength of the recycled cellulose fibers and to impart dry tensile strength to the recycled paper. An acrylamide co-polymer must have some cationic charges to be retained on the cellulose fibers. Because 100% recycled fiber contains high levels of anionic contamination, it is desirable to use highly cationic, charged glyoxalated polyacrylamides to achieve higher resin retention on the fibers and greater dry strength performance.

Cationic polyacrylamides can be obtained by co-polymerization of acrylamide monomers and cationic co-monomers such as diallyl dimethyl ammonium chloride (DADMAC). According to FDA regulations, a cationic polyacrylamide cannot incorporate more than 10% by weight DADMAC; such cationic polyacrylamides have relatively low charge density. A low charge density polymer can be blended with a polymer with a higher charge density and used to strengthen recycled paper. But because high charge density polymers have faster fiber absorption rates than low charge density compounds, the two components of the blend separate and the higher charge density component does not improve retention of the low charge density component.

There is a need in the art for paper strengthening agents with higher charge density. Such agents would be particularly suitable for strengthening 100% recycled paper and mechanical printing paper.

SUMMARY OF THE PRIOR ART

U.S. Pat. Nos. 2,926,154 and 2,926,116 to Keim disclose cationic thermosetting resins which are polymeric reaction products of epichlorohydrin and a polyamide.

U.S. Pat. No. 3,556,932 to Coscia and Williams discloses glyoxalated vinylamide polymers which are used to improve wet- and dry-strength in paper. The polymers are prepared by reacting a pre-formed ionic hydrophilic water-soluble polyvinylamide with glyoxal. Dry forms of the glyoxal and the parent polymer can be pre-blended. U.S. Pat. No. 3,556,933 to Williams and Coscia discloses methods of regenerating the strengthening effect of aged glyoxalated polymers by exposing them to formaldehyde.

U.S. Pat. No. 3,607,622 to Espy discloses a wet strengthening resin prepared by (1) reacting an aminopolyamide, which contains primary and/or secondary amine groups, with an acrylamide and (2) reacting the resultant adduct with a polyaldehyde.

U.S. Pat. No. 4,605,702 to Guerro et al. discloses a copolymer containing an acrylamide and a cationic monomer; the copolymer can be glyoxalated.

U.S. Pat. Nos. 5,585,456 and 5,567,798 to Dulany et al. teach wet strengthening resins which are prepared by (1) reacting a polyamine with a polycarboxylic acid to form a polyamidoamine, (2) reacting the polyamidoamine with a dialdehyde to form a polymer, and (3) reacting the polymer with epichlorohydrin.

Each of U.S. Pat. Nos. 5,674,362 and 5,783,041 to Underwood and U.S. Pat. Nos. 5,427,652 and 5,466,337 to Darlington & Lanier teaches blends of permanent and temporary wet strengthening agents. The permanent wet strengthening agents can be polyamido epichlorohydrin polymers. The temporary wet strengthening agent typically is a cationic polyacrylamide, such as vinylamide, which can be glyoxalated before the blend is formed.

U.S. Pat. Nos. 6,103,861 and 6,245,874 to Staib et al. disclose ionic thermosettable resins which are formed by (1) copolymerizing acrylamide or alkyl-substituted acrylamide with diallylamine or an acid salt of diallylamine and (b) reacting the copolymer with an epihalohydrin and a dialdehyde such as glyoxal.

U.S. Pat. No. 6,429,253 to Guerro & Lawrence discloses resin blends comprising a polymeric cationic wet strengthening agent (e.g., polyamine-amide epichlorohydrin) and a cationic polyacrylamide, which can be glyoxalated before the blend is formed.

Several patents disclose creping adhesives which comprise polymer mixtures. The creping adhesives disclosed in U.S. Pat. Nos. 5,179,150 and 5,187,219 to Furman are blends of glyoxalated vinylamide polymers with polyvinyl acetate or polyols, respectively. The creping adhesives disclosed in U.S. Pat. Nos. 4,528,316 and 4,501,640 to Soerens are aqueous admixtures of polyvinyl acetate and a water-soluble, thermosetting cationic polyamide resin; the resin typically is a reaction product of an epihalohydrin and a polyamide which contains secondary amine groups. U.S. Pat. No. 6,214,932 to Maslanka discloses creping adhesives formed by mixing polyamide and at least one other polymer (e.g., polyvinyl acetate or low molecular weight polyethyleneimine) and then reacting the mixture with an epihalohydrin.

U.S. Patent Application 2004/0118541 to Shannon and Soerens discloses a derivatized polyethylene oxide (PEO) which can be "grafted" with a monomer, such as acrylamide or a meth-acrylamide, and can then be glyoxalated. The derivatized PEO can contain optional chemical additives, including a cationic glyoxalated polyacrylamide.

DETAILED DESCRIPTION OF THE INVENTION

The invention provides methods for producing glyoxalated "inter-copolymers" of high charge density useful for strengthening paper. Glyoxalated inter-copolymers have separate segments of (a) cationic (co)polymers (e.g., polyamidoamine epichlorohydrin polymers such as AMRES®) or nonionic (co)polymers and (b) temporary wet strengthening polymers. Inter-copolymers of the invention have a charge density which is higher than that of blends containing separate, pre-glyoxalated components. The charge density of a glyoxalated inter-copolymer can be adjusted by varying one or more reaction conditions during its preparation, as described below. Products made according to the invention have a high affinity for cellulose fiber and are particularly useful for strengthening 100% recycled paper. The invention also provides paper products strengthened with glyoxalated inter-copolymers and methods of making the strengthened paper products.

Briefly, the method of the invention comprises reacting a first portion of glyoxal with a blended composition. The blended composition comprises (a) a "high charge density polymer" having pendant glyoxal-reactive groups and a higher charge density than that of the cationic or nonionic polyacrylamide and (b) a cationic or a nonionic polyacrylamide having pendant amide groups. The product of the glyoxalation reaction is a glyoxalated inter-copolymer of high charge density which has separate segments of the cationic or nonionic polyacrylamide and the high charge density polymer.

If desired the glyoxalated inter-copolymer can be stabilized by one or more of several methods. The reaction mixture comprising the glyoxalated inter-copolymer can be acidified and reacted with a second portion of glyoxal as described in Ser. No. 10/785,403. Optionally, an aldehyde scavenger can be included at various points during preparation of the glyoxalated inter-copolymer and/or in the final glyoxalated inter-copolymer product, as described in Ser. No. 10/919,487.

The term "polymer" is used throughout this specification in its conventional sense to refer to compounds made from smaller monomers and having a molecular weight of about 500 to 1000 daltons or higher. The term "monomer" is used herein to refer to compounds which are not polymeric and which can polymerize in order to generate a "polymer."

As used herein, "crosslinked" and similar terms are intended to embrace the structural and/or morphological change that occurs, for example, by covalent chemical reaction or ionic interaction between separate macromolecules in a composition.

Polyacrylamide

Polyacrylamides used in methods of the invention have pendant amide groups which can react with glyoxal. Either non-ionic or cationic polyacrylamides can be used.

Acrylamide Monomer

An acrylamide monomer provides the primary reaction sites on the backbone of the polyacrylamide to which the glyoxal substituents are attached. The polyacrylamide must have a sufficient number of acrylamide monomers in its structure (pendant amide groups) so that the resulting glyoxalated polyacrylamide is thermosetting. Generally, the amount of acrylamide monomer should be at least about 10 mole percent based on the total number of acrylamide monomers used to prepare the polyacrylamide. Higher amounts are usually preferred as this has a beneficial effect on the paper strengthening properties of the resulting polymer. As a result, the acrylamide monomer is normally provided in an amount of at least about 50 mole percent and sometimes in excess of 75 mole percent of the total number of acrylamide monomers from which the polyacrylamide is prepared.

The term "acrylamide monomer" is intended to embrace primary vinylamides including not only acrylamide itself but also substituted acrylamides such as methacrylamide, ethylacrylamide, crotonamide, N-methyl acrylamide, N-butyl acrylamide, N-ethyl methacrylamide and the like. Thus, polyacrylamides, which by definition are polymers made from acrylamide monomers, include repeating units from at least some of these various compounds.

Preparation of Cationic Polyacrylamide Using a Cationic Co-Monomer

Suitable cationic polyacrylamides can be prepared by free radical polymerization of an acrylamide monomer in an aqueous system using a chain transfer agent, such as 2-mercaptoethanol, in the presence of a sufficient amount of a cationic co-monomer to provide a cationic polyacrylamide with a suitable cationic character for strengthening paper. The amount of cationic components preferably is sufficient to render the cationic polyacrylamide self-substantive to cellulose fibers in aqueous suspensions. The quantity of polymer retained on cellulose fibers can be determined by measuring the nitrogen content of the fibers both before and after treatment with the cationic polyacrylamide.

Typically, a few cationic co-monomers, and in some cases a single monomer, in each cationic polyacrylamide molecule may be sufficient to provide the polymer with an adequate cationic character to make the polymer substantive to cellulose fibers. A polymer with a suitable amount of cationic character thus can usually be obtained by including at least about 0.001 mole of cationic monomer and upwards of 0.25 mole and possibly more of cationic monomer, per mole of acrylamide monomer in the reaction mixture. Usually an amount between 0.01 and 0.15 mole of cationic monomer per mole of acrylamide monomer should be satisfactory, with an amount between 0.02 and 0.10 being typical.

Suitable co-monomers include a diallyl quaternary monomer (generally diallyl dimethyl ammonium chloride, DADMAC), 2-vinylpyridine, 4-vinylpryridine, 2-methyl-5-vinyl pyridine, 2-vinyl-N-methylpyridinium chloride, p-vinylphenyl-trimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methyl-acroyloxyethyltrimethyl ammonium methylsulfate, 3-acrylamido-3-methylbutyl trimethyl ammonium chloride, 2-(dimethylamino) ethyl acrylate, and mixtures thereof. In addition to chloride, the counterion for cationic co-monomers also can be fluoride, bromide, iodide, sulfate, methylsulfate, phosphate, and the like.

The full complement of the cationic co-monomer(s) can be added all at once at the beginning of the polymerization reaction. Alternatively, the cationic co-monomer(s) can be added continuously along with acrylamide monomers over the time course of the polymerization reaction. In yet another embodiment the full complement of the co-monomer(s) can be added all at once, but only after a certain conversion of acrylamide to form a polyacrylamide homopolymer has occurred. Still other options for reacting the cationic co-monomer with the acrylamide monomer/polyacrylamide polymer will be recognized by those skilled in the art.

The molecular weight of the cationic polyacrylamide typically ranges from about 2,000 to about 25,000 daltons. Suitable cationic polyacrylamides, for example, can be prepared from a mixture of acrylamide and diallyldimethyl ammonium chloride (DADMAC) in a molar ratio between 99:1 and 75:25; the final cationic polyacrylamide preferably has a DADMAC content of up to 0.1 mole percent per mole of acrylamide monomer.

Other Monomers

Other vinyl monomers can be present during preparation of the polyacrylamide and thus become incorporated into the polymer. Such monomers include (1) diluter monomers, i.e., monomers which reduce the concentration of required monomers in the polymer but do not provide any functional site for modification of the polymer, and (2) other functional monomers, i.e., non-amide vinyl monomers which can be incorporated into the polyacrylamide and which have pendant groups which also may react with glyoxal.

Diluter monomers include, for example, acrylic esters such as ethyl acrylate, methylmethacrylate and the like, acrylonitrile, vinyl acetate, N-vinyl pyrrolidone, N,N'-dimethyl acrylamide, hydroxy alkyl(meth)acrylates, styrene, and the like.

Functional monomers include, for example, allylglycidal ether, glycidyl methacrylate and the like. Of special interest are those co-monomers with a 1,2-diol in their structure, such as 3-allyloxy-1,2-propandiol, 3-acryloyloxy-1,2-propandiol and 3-methacryloyloxy-1,2-propandiol.

The diluter monomers can be present in the polymerization mixture in an amount of up to about 0.5 mole per mole of acrylamide monomer, while the amount of functional monomers should not exceed about 0.15 mole per mole of acrylamide monomer. The amount and ratio of the diluter and functional monomers in the polymerization mixture can be used as a control of the extent and distribution of glyoxalation.

In an alternative embodiment, a di-functional co-monomer can be used in order to obtain a branched structure. N,N'-methylene-bisacrylamide, N,N'-methylene-bismethacrylamide, N-allyl acrylamide, and N-allyl methacrylamide are recommended as di-functional co-monomers if a structure with added branching is desired. Di-functional co-monomers typically are used at a concentration of 0.01-5.0 mole percent of acrylamide monomer.

Free Radical Polymerization

Polyacrylamides for use in the invention are prepared by free radical polymerization among the acrylamide monomers and, optionally, the cationic co-monomer, diluter, functional, or di-functional monomers. Free radical polymerization is initiated using known free radical initiators, such as various peroxides, t-butyl hydroperoxide, cumene hydroperoxide, benxoyl peroxide, t-butoxyperoxy hexanoate, and various azo-compounds such as azodiisobutyronitrile (AIBN), azodiisobutyramidine dihydrochloride (AIBA), and dimethylazodiisobutyrate. Other useful initiators are the water-soluble compounds such as hydrogen peroxide and the sodium, potassium, and ammonium persulfates used either by themselves or in activated redox systems. Methods of free radical polymerization are well known in the art.

As well understood by those skilled in the art, the amount of initiator should be sufficient to yield an acceptable reaction rate and, in combination with the level of monomeric reactants and the chain transfer agent as described below, a non-ionic or cationic polyacrylamide adduct (reaction product) of a suitable molecular weight to be water soluble. The amount of initiator, however, should not be so high as to result in an uncontrolled rate of reaction and possible gel formation. The amount of initiator used in the solution polymerization will generally be in the range of 0.01 to 3% by weight, based on the weight of the monomers, and is usually between about 0.2 and 2% by weight. The initiator can be charged at the outset of the polymerization, however, incremental addition of the initiator throughout polymerization can also be employed and may be advantageous in some circumstances. Additional amounts of initiator (introduced by itself or associated with a reducer) can be used at the end of the reaction in order to consume any residual un-reacted monomers.

The polymerization proceeds nicely at a temperature broadly in the range of 30 to 100° C., more usually in the range of 60 to 90° C.

In some cases it also may be desirable to conduct the reaction in the presence of an aliphatic alcohol, such as about 4 to about 15 percent by weight of an aqueous reaction mixture of ethanol, isopropyl alcohol, n-propanol, or butanol.

Chain Transfer Agent

Another constituent of the reaction system is a chain transfer agent. As understood by those skilled in the art, the chain transfer agent functions to limit or control the molecular weight of the polymer formed by the free radical polymerization reaction taking place between the monomeric reactants. Thus, a chain transfer agent preferably is used in an amount sufficient to limit the molecular weight to a desired endpoint for the specific application. The amount of the chain transfer agent should not be so high, however, that it so severely limits the molecular weight of the resulting adduct that the polymer has a poor paper strengthening property. In order to accomplish these objectives, the chain transfer agent will generally be included in the reaction mixture in the range of about 0.1 to 30% by weight, based on the weight of the monomers, and most often will be used in an amount between about 0.5 and 15% by weight. The determination of a suitable level of chain transfer agent to use in any monomer system is a matter of routine experimentation to those of ordinary skill in the art.

The chain transfer agent usually is charged into the reaction mixture at the outset of the polymerization, though it may be added later in the reaction or in increments if desired. Any material which is able to control/limit the extent of the polymerization via chain transfer can be used as the chain transfer agent. Suitable chain transfer agents include allyloxypropane diol, thioglycol, and mercaptans such as 2-mercaptoethanol, hydroxyethyl-3-mercaptopropionate, and dodecylmercaptan.

As understood by those skilled in the art, free radical solution polymerization reactions can be conducted by charging a reactor with appropriate amounts of the various monomers, the chain transfer agent, and the free radical initiator. An amount of water (and an optional water miscible solvent) also is included in the reactor to provide a final solids concentration in the aqueous composition within the range of about 5 to about 50 weight percent. The solids concentration of the aqueous reaction mixture more usually is on the order of 10 to 45 weight percent.

Molecular weights of suitable non-ionic or cationic polyacrylamides typically fall within the range of 500 to 1,000,000 daltons, more usually in the range of 1000 to 100,000 daltons. It is preferred that the polyacrylamide be water-soluble before combining it with the high charge density polymer and subjecting the mixture to glyoxalation. For the most part, polyacrylamide having a molecular weight of less than about 25,000 daltons and especially less than 10,000 daltons is normally preferred. The molecular weight of the polyacrylamide can be influenced by changing one or more of the reaction temperature, the level of solids in the reaction, the amount of initiator, or the amount of chain transfer agent, or by other methods used by those skilled in the art.

High Charge Density Polymer

The high charge density polymer can be any polymer which has pendant groups, such as amine, amide, or hydroxyl groups, able to react with glyoxal ("glyoxal-reactive groups") and which has a higher charge density than the polyacrylamide. The most desirable high charge density polymers are dimethyl polyamines, such as AGEFLOC® (Ciba Specialty Chemicals); and polyamidoamine epichlorohydrin polymers such as diethylenetriamine-adipic acid polyamidoamine epichlorohydrin polymers (e.g., AMRES®); triethylenetetramine-adipic acid polyamidoamine epichlorohydrin polymers; adducts of a triethylenetetramine-adipic acid polyamidoamine epichlorohydrin polymer and an acrylamide (which can be prepared by Michael addition); inter-copolymers of primary amine-terminated cationic polyamidoamine and neutral polyacrylamide (which can be obtained by inter-change reactions); cationic polyacrylamide with a cationic co-monomer concentration over 20% mole; grafted polyacrylamide onto cationic polyamidoamine; cationic starches; grafted cationic polyacrylamide onto cationic starch; and blends thereof. The molecular weight of the high charge density polymer typically is about 10,000 to about 1,000,000 daltons. A charge density ranging from about 2 to 5 meq/g is preferred.

Glyoxalation

Glyoxalation reactions are well known in the art. Depending on the pendant groups or molecular weight of high charge density polymer, standard prior glyoxalation methods can be optimized by adjusting reaction conditions to ensure sufficient glyoxal reacting with base-polymers. Glyoxalation is performed at a total polymer concentration of between about 10 and about 25 weight % in water; typically the concentration of the high charge density polymer is about 5 to about 75% of the total polymer concentration. Altering the concentration of the high charge density polymer can purposely control the charge density of the final product.

The base-polymer and the high charge density polymer have functional groups with a similar reactivity against glyoxal. An inter-copolymer is obtained by linking together two different species through glyoxal bridges. The glyoxal concentration can range from about 1% to about 30% of the total solids. Reaction pH is preferably in the range of 6.5 to 8.0, and reaction temperatures preferably are from about 15° C. to about 40° C. The pH can be controlled using a buffer system. A buffer of mono- and bi-sodium phosphate is suitable, though other buffers would include any material that simultaneously functions as both a weak acid and a weak base and is able to maintain the desired pH, such as monopotassium phosphate plus borax, sodium hydroxide plus a mixture of acetic, phosphoric and boric acids, disodium phosphate plus citric acid.

During the glyoxalation reaction, viscosity of the reaction mixture increases from about 3-10 cPs to about 50-75 cPs. The final glyoxalated inter-copolymer contains segments of polyacrylamide and branches of high charge density polymer chemically bonded through glyoxal units. This inter-copolymer has a higher number of cationic charges than can be obtained simply by glyoxalating a polyacrylamide.

Two-Step Glyoxalation Method

Increased stability can be imparted to a glyoxalated inter-copolymer if glyoxalation is carried out with a "two-step" glyoxalation method. According to this method, an aqueous solution comprising the cationic polyacrylamide and the high charge density polymer is contacted with glyoxal at an alkaline pH in the range of 7.2 to 10.0. The pH can be controlled using a buffer system as described above.

An amount of glyoxal which provides between about 7 to 60 mole percent glyoxal, based on the molar concentration of pendant amide groups and other optional glyoxal-reactive functional groups in the polyacrylamide and in the high charge density polymer is added as the first of at least two separate portions to the polyacrylamide. Stated in another way, 1 to 6 glyoxals are supplied for every 10 pendant amide groups and other optional glyoxal-reactive functional groups in the reaction mixture.

Glyoxalation usually is performed at a temperature of about 15° C. to about 40° C. and in an aqueous solution at a total solids concentration ranging from about 8 weight % to about 30 weight %. The first portion of glyoxal causes glyoxalation and some cross-linking between pendant amide and other glyoxal-reactive functional groups in the two polymers. The second portion of glyoxal is called "glyoxal post-addition" (see below). The molecular weight of the resulting glyoxalated inter-copolymer preferably is increased sufficiently so as to obtain a desired viscosity in the range of about 30 to about 80 cPs at 25° C. for a 20 weight % solids solution. Those skilled in the art will appreciate a suitable extent of crosslinking to obtain such a result.

Acid Quenching

As a desired viscosity is attained, the rate of the glyoxalation reactions and related cross-linking reactions can be slowed and eventually substantially terminated by acid quenching.

A two-step quenching procedure can be used to better control the glyoxalation reactions. For example, the glyoxalation can start at a pH at the higher end of the pH range suitable for the glyoxalation reaction to obtain a higher reaction rate. In order to control the reaction rate, at a certain extent of conversion short of the desired end-point, the pH then is reduced by adding an acid to the reaction mixture (first acid quench to $7.0 \leq pH \leq 7.4$). The reaction then continues at a reduced rate. After a final desired viscosity is reached, a second acid quench is used to reduce the pH further ($3 \leq pH \leq 3.5$) and to substantially terminate the glyoxalation reactions.

It is preferred that the pH of the aqueous reaction system be adjusted to the range of 3 to 5 through addition of an acid. The acid added to the reaction mixture can be either a mineral acid (such as hydrochloric acid, sulfuric acid, phosphoric acid and the like) or an organic acid such as formic acid, acetic acid, citric acid, malic acid, lactic acid, and the like.

A procedure for determining the amount of bound glyoxal in the inter-copolymer is described in Biochemistry, Vol. 81, pp. 47-56 (1977), which is incorporated by reference herein. Additional details on suitable reaction conditions for binding glyoxal to a primary vinylamide also are described in U.S. Pat. No. 3,556,932, which is also incorporated herein by reference.

Glyoxal Post-Addition

Following the acid quench, an optional second portion of glyoxal can be added to the composition to enhance its stability. The amount of glyoxal added in the second portion is about 1% to about 75% by weight of the first portion of glyoxal, more usually between about 4 and about 50 weight percent. By increasing the amount of free glyoxal in the composition at this point, an equilibrium is established that reduces the tendency of the composition to undergo further cross-linking before use, e.g., on shipping and storage. The glyoxalated inter-copolymer composition thus exhibits an improved stability because of the glyoxal post-addition.

The stability enhancement produced by the two-step glyoxal addition cannot be obtained simply by adding a higher amount of glyoxal in the first portion. The kinetics of the glyoxalation reactions, in the presence of a higher initial amount of glyoxal, precludes obtaining a balance between molecular weight (extent of cross-linking) and residual free glyoxal which results in the higher level of stability observed for the present composition.

Buffers

Further stability enhancement of a composition comprising a glyoxalated inter-copolymer is obtained by adding a buffer which regulates (stabilizes) the pH of the glyoxalated inter-copolymer composition between about 3 and 3.5. One suitable buffer is a mixture of 20 parts by volume of a 0.2 M sodium hydroxide with 100 parts by volume of a stock solution containing 0.4 M acetic acid, 0.4 M phosphoric acid, and 0.4 M boric acid.

Other buffers which could be used include materials which simultaneously function as both a weak acid and a weak base, such as citric acid with sodium citrate, disodium phosphate with citric acid, succinic acid with borax, acetic acid with sodium acetate, monopotassium phthalate with hydrochloric acid, bicarbonates, carbonate esters, complex carbonate salts of organic acids, hydrogen phosphates, phosphate esters, phosphinate esters, borates, borate esters, hydrogen sulfates, sulfinates, and sulfate esters.

Other examples of suitable buffers include potassium bicarbonate, potassium biphthalate, potassium bisulfate, potassium dihydrogen citrate, dipotassium hydrogen citrate, potassium dihydrogen phosphate, dipotassium hydrogen phosphate, potassium hydrogen tartrate, potassium hydrogen oxolate, potassium hydrogen maleate, potassium hydrogen succinate, potassium hydrogen glutarate, potassium hydrogen adipate, potassium tetraborate, potassium pentaborate, potassium octaborate and all the corresponding sodium salts, complex calcium carbonate salts of organic acids (such as octanoic acid, iso-octanoic acid, 2-ethyl hexanoic acid, hexanoic acid, and the like) and other similar materials known in the art.

Further Stabilization Using an Aldehyde Scavenger

Yet another improvement to the stability of the glyoxalated inter-copolymer composition is garnered by adding one or more aldehyde scavengers to the glyoxalated inter-copolymer and/or at one or more of its preparation steps. The stability of the glyoxalated inter-copolymer depends upon a balance between the free glyoxal in the composition and the reactive pendant aldehyde and other functional groups. In order to reduce the reactivity of the aldehyde and other functional groups, a mono-functional aldehyde scavenger material preferably of a low volatility (high boiling point) is used.

Compounds with a single hydroxyl group such as lactic acid, malic acid, citric acid, choline chloride and the like can be used. Such aldehyde scavengers are present in an amount of about 0.0001 to 0.25 mole per mole of glyoxal added during glyoxalation or, in the case of the two-step glyoxalation method, in both the first and second portions (the total glyoxal amount), preferably in an amount of 0.01 to about 0.15 mole per mole of total glyoxal. In the presence of an aldehyde scavenger, the pH tends to remain constant and the shelf-life of the composition tends to be increased further. The longer storage life of the stabilized product allows the glyoxalated inter-copolymer composition to be stored at a higher concentration (no dilution is required), and the only dilution that needs to be taken into account is at the wet end of the paper process.

Preferred Aldehyde Scavengers

Preferred aldehyde scavengers are adducts of choline or a choline salt and an acrylamide monomer and have the structure shown below:

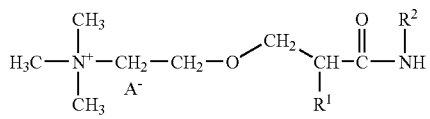

The acrylamide monomer is a monomer of a primary vinylamide, including not only acrylamide itself but also substituted acrylamides having the formula:

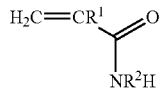

wherein $R^1$ is hydrogen or $C_1$-$C_2$ alkyl and $R^2$ is hydrogen or $C_1$-$C_4$ alkyl.

"$A^-$" is a compatible anion such as hydroxyl or any negatively charged ion which can form a salt with choline (e.g., chloride).

Preferred aldehyde scavengers are much more efficient than scavengers which contain a hydroxyl group. In addition, preferred aldehyde scavengers can provide supplementary cationic charges for the polymer backbone because any reaction between an aldehyde pendant group and the adduct will result in an additional cationic charge on an acrylamide polymer or inter-copolymer.

An adduct of choline chloride and acrylamide (ethanaminium, 2-(3-amino-3-oxopropyl)-N,N,N-trimethyl-, chloride) is a particularly preferred aldehyde scavenger:

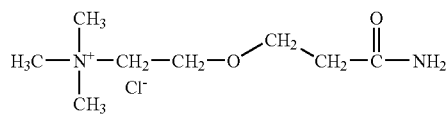

Preparation of Preferred Aldehyde Scavengers

Preferred aldehyde scavengers are prepared by reacting choline or a choline salt with an acrylamide monomer, as shown below:

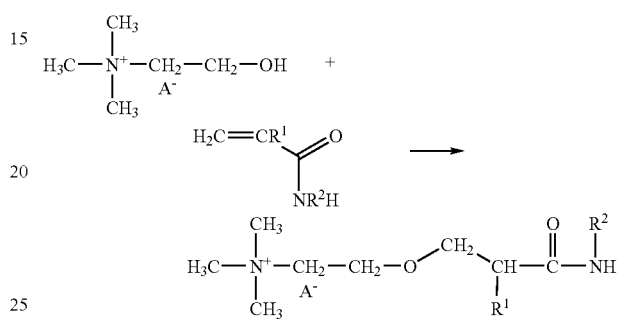

Preferred aldehyde scavengers can be prepared, for example, through a Michael addition reaction. The Michael addition can be performed in an aqueous solution containing about 2.5% by weight sodium hydroxide at a temperature in the range of 70° to 100° C. The molar ratio between the choline or choline salt and the acrylamide monomer can be in the range of 1:1 to 1:0.5 with the solids content of the reactants between about 25 to 70 wt. %. In such reactions, the acrylamide conversion to aldehyde scavenger is higher than 95% (based on free acrylamide concentration measurements). The resultant preparation can be used without further purification.

Addition of Aldehyde Scavengers

One or more aldehyde scavengers can be added to glyoxalated inter-copolymer compositions and/or during one or more of its preparation steps. Preferred aldehyde scavengers also can be added during polymerization of the polyacrylamide. The longer storage life of the resultant stabilized product allows the glyoxalated inter-copolymer composition to be stored at a higher concentration (no dilution is required), and the only dilution that needs to be taken into account is at the wet end of the paper process. Thus, shipping and storage costs associated with such stabilized compositions are generally lower than with prior art compositions.

Addition of a Preferred Aldehyde Scavenger During Polymerization of the Polyacrylamide Not all acrylamide monomers form an adduct between the choline or choline salt during preparation of a preferred aldehyde scavenger; unless further purified, a preparation of preferred aldehyde scavenger will contain free acrylamide monomers. If a preferred aldehyde scavenger is present during polymerization of a polyacrylamide, the free acrylamide monomers will be incorporated into the polyacrylamide and the aldehyde scavenger will already be present when glyoxalation of the polyacrylamide and the high charge density polymer begins; presence of the preferred aldehyde scavenger at that point can increase the density of positive charges on the glyoxalated inter-copolymer.

If added during polymerization of the polyacrylamide, a preferred aldehyde scavenger typically is present in an amount ranging from about 0.7 mole to about 1.5 mole percent based upon total acrylamide monomer.

Addition of an Aldehyde Scavenger During and at the Beginning of Glyoxalation

Some wet strength arises from cationic charges binding with anionic sites on cellulose. If this binding is disrupted, the polymer chain will be free and unable to impart wet strength to paper. Adding one or more aldehyde scavengers at the beginning of glyoxalation increases the number of cationic charges on the inter-copolymer backbone, thereby increasing the ability of the glyoxalated inter-copolymer to impart wet strength to paper.

During glyoxalation, free (un-reacted) glyoxal is in equilibrium with glyoxalated glyoxal-reactive groups on the polyacrylamide and on the high charge density polymer. If a preferred aldehyde scavenger is present, for example, free preferred aldehyde scavenger is in equilibrium with adducts between the scavenger and glyoxalated groups on the two polymer components. The free preferred aldehyde scavenger slows down the reaction between un-glyoxalated glyoxal-reactive groups and free glyoxal. These embodiments of the invention provide a glyoxalated inter-copolymer with cationic charges as pendant groups which are bonded to the backbone through breakable bonds. Thus, a glyoxalated inter-copolymer composition having a higher positive charge density is obtained than if the preferred aldehyde scavenger had not been present. Such compositions have a greater affinity for cellulose fibers than compositions prepared using other, non-charged scavengers.

Because the preferred aldehyde scavenger provides cationic charges to the glyoxalated inter-copolymer in these embodiments, the acrylamide monomers need not be polymerized with cationic co-monomers. Thus, the polyacrylamide can be a polyacrylamide homopolymer or can be a copolymer with a cationic co-monomer but at a lower concentration of cationic co-monomer than described the paragraphs above.

If added at the beginning of glyoxalation, a preferred aldehyde scavenger preferably is present in an amount ranging from about 0.7 to about 1.5 mole for each mole of total glyoxal.

If desired, one or more preferred aldehyde scavengers can be included at any point during the first glyoxalation reaction (i.e., before the acid quench). The resultant glyoxalated product has a longer shelf life. In addition, the endpoint of the glyoxalation reaction can be better controlled.

If added during the first glyoxalation reaction, a preferred aldehyde scavenger preferably is present in an amount ranging from about 0.1 to about 0.5 mole for each mole of total glyoxal.

Addition of an Aldehyde Scavengers after Glyoxalation

A preferred aldehyde scavenger can be added after initial glyoxalation (i.e., during or after the acid quench). Addition of an aldehyde scavenger after glyoxalation also results in a longer shelf life for the final stabilized glyoxalated inter-copolymer composition.

If added during the acid quench, a preferred aldehyde scavenger preferably is present in an amount ranging from about 0.01 to about 0.15 mole for each mole of total glyoxal. If added after the acid quench, a preferred aldehyde scavenger preferably is present in an amount ranging from about 0.01 to about 0.3 mole for each mole of total glyoxal.

Addition to Glyoxalated Inter-Copolymer Compositions ("Post-Glyoxal Addition")

The pH of compositions comprising glyoxalated inter-copolymers tends to remain constant and the shelf-life of the composition tends to be increased further in the presence of aldehyde scavengers, including preferred aldehyde scavengers. As described above, stabilized glyoxalated inter-copolymers can be prepared by adding a second portion of glyoxal after the acid quench. Aldehyde scavengers, particularly preferred aldehyde scavengers, also provide enhanced stability to these stabilized glyoxalated inter-copolymer.

If added to a glyoxalated inter-copolymer composition, a preferred aldehyde scavenger preferably is present in an amount ranging from about 0.01 to about 0.3 mole for each mole of total glyoxal.

Blends of Glyoxalated Inter-Copolymers and Polymeric Paper Strengthening Agents

Glyoxalated inter-copolymers can be blended with other polymeric paper strengthening agents. These agents can be cationic polymers, anionic polymers, or a neutral polymers; they can be homopolymers or copolymers; they can be water soluble or water dispersible.

Numerous cationic paper strengthening agents are known in the art and include dialdehyde starch, polyethylemeimine, mannogalactan gum, and dialdehyde mannogalactan. See, e.g., U.S. Pat. No. 5,427,652. Preferred cationic polymeric paper strengthening agents used in compositions of the invention include thermosetting cationic polyamine or polyamide wet-strength resins which are commonly used in papermaking. Most of these resins are reaction products of polyamines and polyamides with halohydrins, such as epichlorohydrin. Illustrative examples of the polyamine, cationic wet-strength resins are those described in U.S. Pat. Nos. 2,926,154; 2,969,302; 3,248,353; 3,269,852; 3,224,990; 3,248,280; 3,372,086; 3,556,932; 4,217,425; 4,603,176; 4,605,702; 4,853,431; 5,427,652; 5,466,377; 5,567,798; 5,674,362; 5,723,022; 5,783,041; 6,077,394; 6,429,253; and RE 26,018.

Preferred cationic polymers include, but are not limited to, poly(diallyl dimethyl ammonium chloride) (polyDADMAC); polyamidoamine (prepolymer); polyamido-amine-Epi (AMRES®); DADMAC copolymers; inter-copolymers of cationic polyamidoamine (primary amine terminated) and neutral polyacrylamide obtained by interchange reactions; cationic polyacrylamide with a cationic co-monomer concentration over 20% by mole; grafted polyacrylamide onto a cationic polyaminoamine; cationic starches; grafted cationic polyacrylamide onto cationic starch; cationic styrene maleic anhydride (SMA); cationic latexes; and mixtures thereof. Particle cores for cationic latexes can be made by polymerization or copolymerization of any hydrophobic monomer (e.g., styrene, butyl acrylate or any other acrylic ester, methyl methacrylate or any other methacrylic ester, etc.). Cationic latexes can be stabilized by a cationic emulsifier or can be "self-stabilized" (if a cationic monomer is involved in the free-emulsifier emulsion copolymerization).

Preferred anionic polymers include acrylamide-acrylic acid copolymers, styrene acrylic acid copolymers, styrene maleic anhydride copolymers, styrene-acrylic acid-hydroxyethyl acrylate copolymers, carboxymethylcellulose (CMC), anionic latex, and mixtures thereof.

Neutral polymers include polyvinyl alcohol, starch, polyhycroxyethyl acrylate, and mixtures thereof.

Preparation and Use of Blended Compositions

Blended compositions of the invention typically are made by mixing one or more polymeric paper strengthening agent(s) and the glyoxalated inter-copolymer at about 20-35° C. for from about 1 to about 30 minutes. For some applications, such as for use with repulpable paper, it may be advantageous to form a composition of the invention 1, 2, or several days before using the blended composition to strengthen paper. The concentration of the glyoxalated inter-copolymer is within the range of about 40-99% of the combined weight of the polymeric paper strengthening agent(s) and the glyoxalated inter-copolymer by weight, based on solids. The ratio of the glyoxalated inter-copolymer and the polymeric paper strengthening agent(s) can be varied to obtain blended compositions with different final solids concentrations, viscosities, charge densities. A preferred aldehyde scavenger can be used to vary the number of available reactive aldehyde groups and to vary the charge density of the glyoxalated inter-copolymer. Such adjustments are within the skill of those in the art.

Use of Glyoxalated Inter-Copolymers as Strengthening Agents

Compositions of glyoxalated inter co-polymers prepared as described above are readily employed in the manufacture of paper, particularly recycled paper, as an aqueous solution. Generally, a composition used as a paper strengthening agent will have a solids concentration between about 5 and 30 weight percent. The composition is not limited to treating any particular type of paper and should find application in Kraft paper, sulfite paper, semichemical paper, and the like, including paper produced using both bleached and unbleached pulps.

When using a composition of this invention in papermaking, it can be added at any time before, during or after the paper is formed. The composition is conveniently added at the wet end of a paper-making facility to the dilute cellulose fiber suspensions. Alternatively, a composition of the present invention also can be added to a previously prepared paper by padding, spraying, immersing, printing and the like.

A composition of this invention can be added to paper pulp over a wide range of pH values. However, best results should be obtained by adding the composition to the paper pulp at a pH of from about 5 to about 8, most preferably from about 5.5 to about 7.0. Compositions of the present invention are readily absorbed by the cellulose fibers at these pH values.

The amount of added glyoxalated inter-copolymer can be as low as about 0.03% of the dry weight of the cellulose fibers, but usually does not exceed about 10% by weight. An amount in the range of 0.1% to 4% of the dry paper weight is more usual.

No heat curing is required with a composition of the present invention because the resulting glyoxalated co-polymers develop their optimum strength on normal drying of the paper. Thus, a polymer composition of this invention develops its strength both at room temperature and at temperatures at which paper is normally dried (190° F. to 350° F., 88° C. to 176° C.).

All patents, patent applications, and references cited in this disclosure are expressly incorporated herein in their entireties by reference. The above disclosure generally describes the present invention. A more complete understanding can be obtained by reference to the following specific examples, which are provided for purposes of illustration only and are not intended to limit the scope of the invention.

EXAMPLE 1

Preparation and Properties of an Aminopolyamide-Acrylamide Adduct

To a 1 liter resin kettle equipped with a stirrer, thermometer, and pH meter were added 400.1 parts of a polyamidoamine prepolymer (45% solids, 0.85 mole). The prepolymer was a condensation product of diethylenetriamine and adipic acid; its synthesis is described in Example 1 of U.S. Pat. No. 4,853,431. To the prepolymer solution were added 60.4 parts of acrylamide monomer solution (50% active, 0.425 mole). The solution was diluted to 34% solids with 160.9 parts of water. The resulting solution was heated to 70° C. and held between 68-70° C. for 2 hours.

The solution was cooled to 25° C. After reaching temperature, 41.9 parts of epichlorohydrin (99% active) were added drop-wise over approximately 30 minutes. The solution was allowed to exotherm to 30° C. and then held at 30° C. for 1 hour.

The solution was heated to 60° C. and reacted to an "A" Gardner-Holdt viscosity. The reaction was acidified to pH 4.0 with 28.1 parts of a 50/50 formic/sulfuric acid mixture and simultaneously cooled to 25° C.

The final resin product contained total oven solids of 27%. Its pH after quench was 3.72, and it had a Brookfield viscosity of 22 cps at 25° C. The charge density as measured by a Mutek Charge Analyzer was +0.85 meq/g at pH 4 and +3.72 meq/g at pH 8.

EXAMPLE 2

Glyoxalation of 95% Polyacrylamide and 5% Polyamido-Amine-Epi (AMRES®)

In 1 liter glass reactor equipped with condenser, stirrer and a jacketed connected to a circulated constant temperature water bath, were added 109.50 g of acrylamide-DADMAC copolymer (41.34% solids, charge density of 0.71 meq/g) and 13.51 g of AMRES® resin (29.61% solids, charge density of 3.9 meq/g), 207.2 g water, and 38.0 g of a 40% weight glyoxal aqueous solution. The temperature was set to 25° C. The pH was adjusted to 8 by the addition of 12.92 g 1N sodium hydroxide. Then 38.56 g of sodium phosphate buffer (pH 8, 7.3% concentration) was added. The pH of the solution was maintained at 8 by continuously adding 0.05N sodium hydroxide.

As soon as the Brookfield viscosity of the reaction solution reached 25 cPs, the pH was lowered to 6.9 by adding 0.98 g of a 35% weight sulfuric acid aqueous solution. When the polymer reaction solution reached a Brookfield viscosity of 65.8 cPs, the pH was lowered to 3.3 with 3.0 g of a 35% weight sulfuric acid. A citric acid buffer solution (41.2 g of 16.5% concentration) was added. A post-addition of 10.0 g of a 40% glyoxal solution was used. The solids content was adjusted to 12.5% with water. The resulting resin had a cationic charge density of 0.89 meq/gm, pH of 3.3 and a viscosity of 20.4 cPs at 25° C. The resulting resin's shelf life was 20 days at 35° C.

EXAMPLE 3

Glyoxalation of 90% Polyacrylamide and 10% Polyamido-Amine-Epi (AMRES®)

The same procedure as in Example 2 was used, except that 27.03 g of AMRES® was used and the acrylamide-DADMAC copolymer was reduced to 99.9 g. The sodium hydroxide solution demand for initial pH adjustment and maintaining the reaction at pH 8 was about 40% higher than that in Example 1. The polymer reaction solution was quenched at the Brookfield viscosity of 67.0 cPs with 3.9 g of a 35% weight sulfuric acid.

The post addition treatment to the acid-quenched polymer was the same as Example 2. The final resin had a solids concentration of 12.52 wt. %, a cationic charge density of about 1.01 meq/g, a pH of 3.27 and a viscosity of 20.1 cPs at 25° C. The resulting resin's shelf life was 19 days at 35° C.

EXAMPLE 4

Glyoxalation of 95% Polyacrylamide and 5% Cationic Polyamine

The same procedure as in Example 2 was used, except that 8.8 g of AGEFLOC® B50LV aqueous solution (50% solids, charge density of 8.07 meq/g) was used instead of AMRES®. When the polymer reaction solution reached a Brookfield viscosity of 63.2 cPs, the pH was lowered to 2.71 with 2.7 g of a 35% weight sulfuric acid. The post addition treatment to the acid-quenched polymer was the same as Example 2. The final resin had a solids concentration of 12.56 wt. %, a cationic charge density of about 1.1 meq/g, a pH of 2.83 and a viscosity of 15.4 cPs at 25° C. The resulting resin's shelf life was 23 days at 35° C.

EXAMPLE 5

Glyoxalation of 85% Polyacrylamide and 15% Acrylamide-Modified AMRES® Resin

The same procedure as in Example 2 was used, except that the AMRES® was replaced with 45.6 g of acrylamide-modified AMRES® resin (26.32% solids, charge density of 3.8 meq/g, obtained according to Example 1). 90.2 g of the same acrylamide-DADMAC copolymer was used. The polymer reaction solution was quenched at 65.6 cPs by 35% weight sulfuric acid. The post addition treatment to the acid-quenched polymer was the same as described in Example 2. The final resin had a solids concentration of 12.44 wt. %, a cationic charge density of about 1.26 meq/g, a pH of 3.1 and a viscosity of 18.2 cPs at 25° C. The resulting resin's shelf life was 19 days at 35° C.

EXAMPLE 6

Glyoxalation of 85% Polyacrylamide and 15% Cationic Liquid Starch (Dynasize 20)

The same procedure as in Example 5 was used, except that the acrylamide-modified AMRES® resin was replaced with 35.4 g of liquid starch (29.262% solids, charge density of 0.41 meq/g, obtained from International Additive Concepts, Inc). The reactor solid was 14% instead of 16% in Example 5. The polymer reaction solution was quenched at 55.0 cPs by 35% weight sulfuric acid. The post addition treatment to the acid-quenched polymer was the same as Example 5. The final resin had a solids concentration of 12.54 wt. %, a cationic charge density of about 0.56 meq/g, a pH of 3.27 and a viscosity of 18.4 cPs at 25° C. The resulting resin's shelf life was significantly improved, 40 days at 35° C.

EXAMPLE 7

Glyoxalation of 85% Polyacrylamide and 15% Acrylamide-Modified AMRES® Resin

The same procedure as in Example 5 was used, except that the acrylamide-DADMAC copolymer was replaced with 152.7 g of noncharged low molecular weight polyacrylamide (38.7% solids). 61.3 g of the same acrylamide-modified AMRES® resin was used. The reactor solid was 21.5% instead of 16% in Example 5. The water usage was reduced to 71.73 g. The temperature was set to 30° C. As soon as the Brookfield viscosity of the reaction solution reached 27.9 cPs, the pH was lowered to 7.2 by sulfuric acid. The polymer reaction solution was finally quenched at 58.0 cPs. The post addition treatment to the acid-quenched polymer was the same as Example 5. The final resin had a solids concentration of 20.14 wt. %, a cationic charge density of about 0.55 meq/g, a pH of 3.25 and a viscosity of 25 cPs at 25° C. The resulting resin's shelf life was 30 days at 35° C.

EXAMPLE 8

Glyoxalation of 50% Highly Cationic Charged Polyacrylamide and 50% Non-Charged Polyacrylamide In 1 liter glass reactor equipped with condenser, stirrer, and a jacket connected to a circulated constant temperature water bath, were added 98.59 g of highly charged polyacrylamide-DADMAC copolymer (42.6% solids, charge density of 0.44 meq/g) and 103.41 g of non-charged polyacrylamide polymer (40.59% solids), 133.23 g water, 56.41 g of a 40% weight glyoxal aqueous solution, and 60.23 g sodium phosphate buffer (pH 8, 7.0% concentration). The temperature was set to 30° C. The pH was adjusted to 8 by the addition of 15.44 g 1N sodium hydroxide. The pH of the solution was maintained at 8 by continuously adding 0.05N sodium hydroxide. As soon as the Brookfield viscosity of the reaction solution reached 12.0 cPs, the pH was lowered to 7.2 by adding 0.72 g of a 35% weight sulfuric acid aqueous solution. When the polymer reaction solution reached a Brookfield viscosity of 56 cPs, the pH was lowered to 3.3 with 4.82 g of a 35% weight sulfuric acid. A citric acid buffer solution (51.3 g of 17.09% concentration) was added. A post-addition of 2.1 g of a 40% glyoxal solution was used. The solids content was adjusted to 20.0% with water. The resulting resin has a cationic charge density of 0.392 meq/gm, pH of 3.25 and a viscosity of 22.9 cPs at 25° C. The resulting resin's shelf life was 27 days at 35° C.

The invention claimed is:

1. A method for producing a glyoxalated inter-copolymer of high charge density useful for strengthening paper, comprising:
   (a) reacting a first portion of glyoxal with a blended composition comprising (1) a polyacrylamide having pendant amide groups and (2) a high charge density polymer having pendant glyoxal-reactive groups selected from the group consisting of (A) a polyamidoamine epichlorohydrin polymer; (B) a Michael addition adduct of a polyamidoamine epichlorohydrin polymer and an acrylamide; (C) an interchange reaction inter-copolymer of primary amine-terminated cationic polyamidoamine and neutral polyacrylamide; (D) a cationic polyamidoamine grafted polyacrylamide; and (E) mixtures thereof, to form a first mixture comprising a glyoxalated inter-copolymer of high charge density having separate segments of the polyacrylamide and the high charge density polymer.

2. The method of claim 1 further comprising:
   (b) adding an acid to the first mixture to form a second mixture having reduced pH; and
   (c) adding a second portion of the glyoxal to the second mixture to form a stabilized glyoxalated inter-copolymer.

3. The method of claim 1 wherein the high charge density polymer is a polyamidoamine epichlorohydrin polymer.

4. A composition for enhancing the wet strength of paper prepared by the method of claim 1.

5. Paper strengthened by the composition of claim 4.

6. A method for producing a glyoxalated inter-copolymer of high charge density useful for strengthening paper, comprising:

(a) reacting a first portion of glyoxal with a blended composition comprising (1) a polyacrylamide having pendant amide groups and (2) a high charge density polymer having pendant glyoxal-reactive groups selected from the group consisting of (A) a polyamidoamine epichlorohydrin polymer; (B) a Michael addition adduct of a polyamidoamine epichlorohydrin polymer and an acrylamide; (C) an interchange reaction inter-copolymer of primary amine-terminated cationic polyamidoamine and neutral polyacrylamide; (D) a cationic polyamidoamine grafted polyacrylamide; (E) a cationic starch; (F) a grafted cationic polyacrylamide cationic starch; and (G) mixtures thereof, to form a first mixture comprising a glyoxalated inter-copolymer of high charge density having separate segments of the polyacrylamide and the high charge density polymer;

(b) adding an acid to the first mixture to form a second mixture having reduced pH; and (c) adding a second portion of glyoxal to the second mixture to form a stabilized glyoxalated inter-copolymer.

7. The method of claim 6 wherein the polyacrylamide (1) is a non-ionic polyacrylamide.

8. The method of claim 6 wherein the polyacrylamide (1) is a cationic polyacrylamide.

9. The method of claim 8 wherein the cationic polyacrylamide (1) comprises diallyl dimethyl ammonium chloride (DADMAC) in an amount of up to about 0.1 mole percent of the acrylamide monomer.

10. The method of claim 8 further comprising preparing the cationic polyacrylamide (1) by free radical polymerization of an acrylamide monomer in the presence of a cationic co-monomer.

11. The method of claim 10 wherein the cationic co-monomer is selected from DADMAC, 2-vinylpyridine, 4-vinylpyridine, 2-methyl-5-vinyl pyridine, 2-vinyl-N-methylpyridinium chloride, p-vinylphenyl-trimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, 3-acrylamido-3-methylbutyl trimethyl ammonium chloride and 2-(dimethylamino) ethyl acrylate.

12. The method of claim 10 wherein the cationic co-monomer is used in a concentration of 1-15 mole percent of the acrylamide monomer.

13. The method of claim 6 wherein the polyacrylamide is prepared by free radical polymerization of an acrylamide monomer and a cationic co-monomer in the presence of an aldehyde scavenger which is an adduct of choline chloride and acrylamide.

14. The method of claim 13 wherein the aldehyde scavenger has the structure:

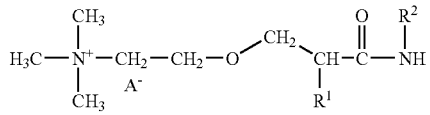

wherein:
$R^1$ is hydrogen or $C_1$-$C_2$ alkyl;
$R^2$ is hydrogen or $C_1$-$C_4$ alkyl; and
$A^-$ is a compatible anion.

15. The method of claim 14 wherein $R^1$ and $R^2$ are each hydrogen and $A^-$ is chloride.

16. The method of claim 6 wherein the polyacrylamide is prepared in the presence of a di-functional monomer to obtain a branched structure.

17. The method of claim 16 wherein the di-functional monomer is selected from the group consisting of N,N'-methylene-bisacrylamide, N,N'-methylene-bismethacrylamide, N-allyl acrylamide, N-allyl methacrylamide and mixtures thereof.

18. The method of claim 16 wherein the di-functional monomer is used in a concentration of 0.01-5.0 mole percent of acrylamide monomer.

19. The method of claim 6 wherein the first portion of glyoxal is provided in an amount of 10 to 60 mole percent of the pendant amide groups.

20. The method of claim 6 wherein the second portion of glyoxal is from about 1 to about 75 weight percent of the first portion of glyoxal.

21. The method of claim 6 wherein the second portion of glyoxal is from about 4 to about 50 weight percent of the first portion of glyoxal.

22. The method of claim 6 further comprising adding an aldehyde scavenger to the first mixture.

23. The method of claim 22 wherein the aldehyde scavenger is selected from the group consisting of lactic acid, malic acid, citric acid, and choline chloride.

24. The method of claim 22 wherein the aldehyde scavenger is added to the first mixture in an amount of 0.0001 to 0.25 mole per mole of total glyoxal.

25. The method of claim 22 wherein the aldehyde scavenger is an adduct of choline chloride and acrylamide.

26. The method of claim 25 wherein the aldehyde scavenger has the structure:

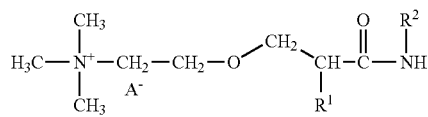

wherein:
$R^1$ is hydrogen or $C_1$-$C_2$ alkyl;
$R^2$ is hydrogen or $C_1$-$C_4$ alkyl; and
$A^-$ is a compatible anion.

27. The method of claim 26 wherein $R^1$ and $R^2$ are each hydrogen and $A^-$ is chloride.

28. The method of claim 25 wherein the aldehyde scavenger is present in step (a) in an amount ranging from about 0.1 to about 0.5 mole for each mole of total glyoxal.

29. The method of claim 25 wherein the aldehyde scavenger is present in step (b) in an amount ranging from about 0.01 to about 0.15 mole for each mole of total glyoxal.

30. The method of claim 25 wherein the aldehyde scavenger is present in step (c) in an amount ranging from about 0.01 to about 0.3 mole for each mole of total glyoxal.

31. The method of claim 25 wherein the aldehyde scavenger is added to the stabilized glyoxalated inter-copolymer in an amount ranging from about 0.01 to about 0.3 mole for each mole of total glyoxal.

32. The method of claim 6 further comprising including an aldehyde scavenger in one or more of step (a), step (b), step (c), and the stabilized glyoxalated inter-copolymer.

33. A composition for enhancing the wet strength of paper prepared by the method of claim 6.

34. Paper strengthened by the composition of claim 33.

35. The composition of claim 33 wherein the high charge density polymer has a molecular weight of 10,000 to 1,000,000 daltons.

36. The composition of claim 33 wherein the high charge density polymer has a charge density of 2 to 5 meq/g.

* * * * *